W. A. Wood,
Harvester Rake.
No. 20119 — Patented April 27, 1858
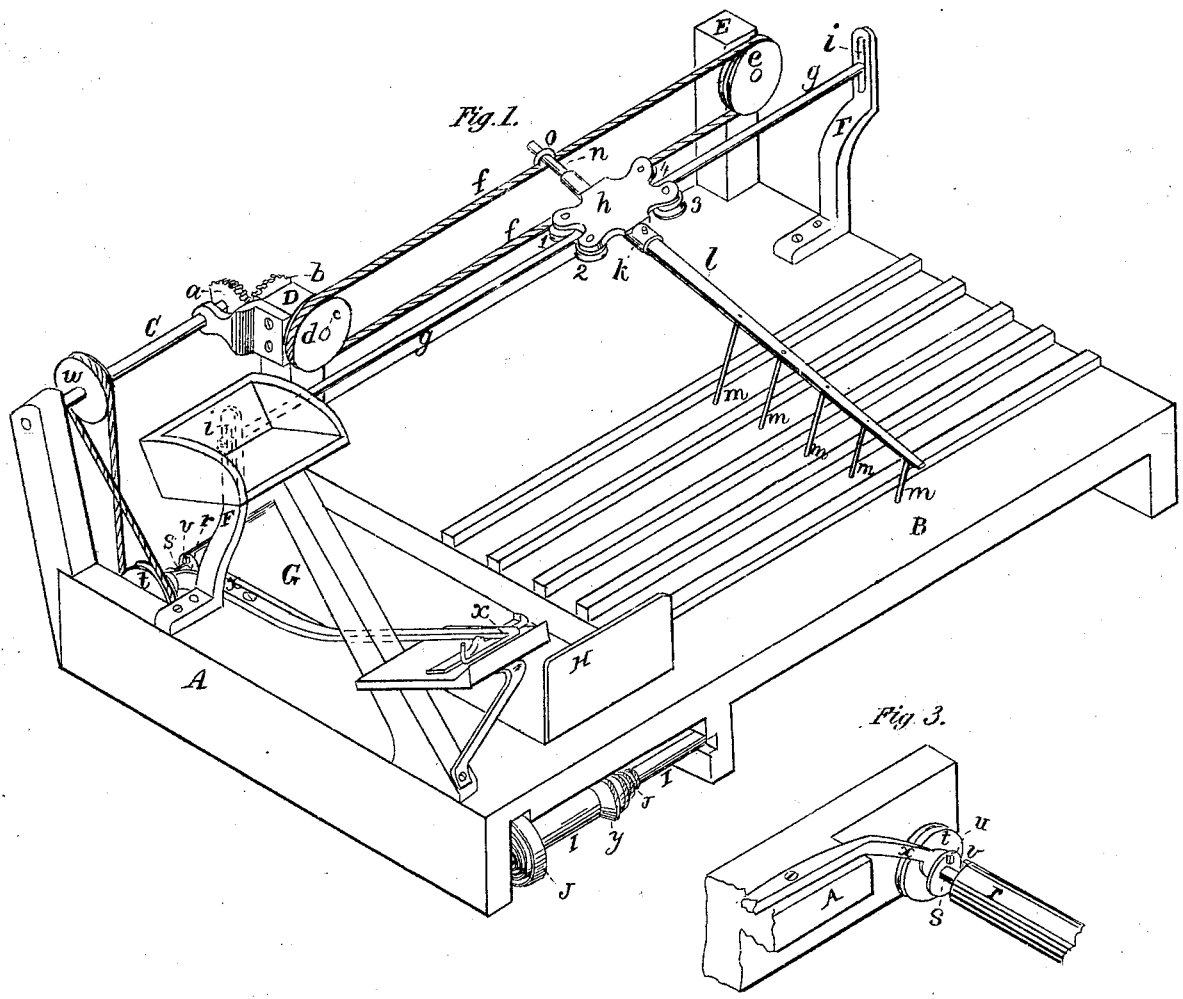
Fig. 1.
Fig. 3.
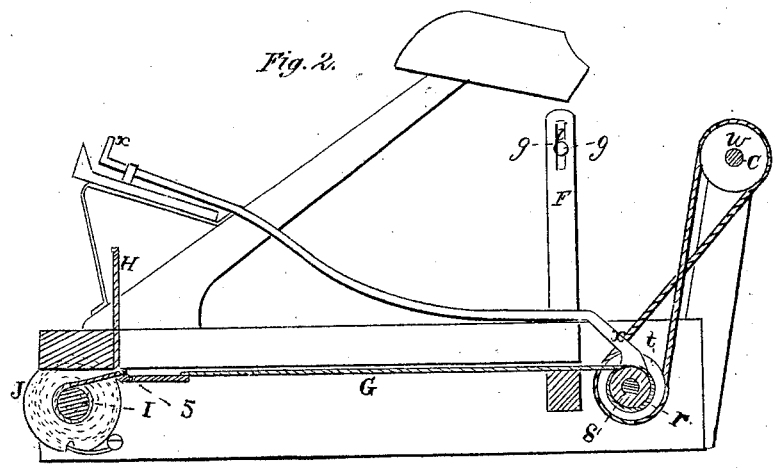
Fig. 2.

UNITED STATES PATENT OFFICE.

W. A. WOOD, OF HOOSICK FALLS, NEW YORK.

IMPROVEMENT IN RAKING AND DELIVERING ATTACHMENTS TO HARVESTERS.

Specification forming part of Letters Patent No. 20,119, dated April 27, 1858.

*To all whom it may concern:*

Be it known that I, W. A. WOOD, of Hoosick Falls, in the county of Rensselaer and State of New York, have invented certain new and useful Improvements in a Raking and Delivering Apparatus for Harvesting-Machines; and I do hereby declare the following to be a full, clear, and exact description of the construction and operation of the same, reference being had to the accompanying drawings, making a part of this specification, in which—

Figure 1 represents a perspective view. Fig. 2 represents a transverse section, and Fig. 3 represents in perspective a portion of the clutch arrangement detached.

Similar letters of reference, where they occur in the several figures, denote like parts of the apparatus in all of them.

My invention consists in giving to a rake which works entirely above the platform its reciprocating and rising-and-falling motion by means of a single traveling endless belt or chain; and, secondly, in combining with an automatic rake which draws and deposits the cut grain at the end of the platform a delivering apparatus which is operated by the machine whenever the conductor desires it, and when sufficient has accumulated to form a gavel, as will be hereinafter explained.

To enable others skilled in the art to make and use my invention, I will proceed to describe the same in connection with the drawings.

A represents a portion of the main frame, so much only as is necessary to illustrate the nature and object of my invention being shown in the drawings, and B represents the platform.

C is a shaft supported in suitable bearings, and rotated by any common mechanical connection with the main driving and supporting wheel or its axle. On this shaft C there is a bevel-gear, *a*, which meshes with a similar bevel-gear, *b*, that is supported on a short shaft or axis, *c*, passing through the stud D and rotating therein. On the opposite end of the shaft or axis *c* from the bevel-gear *b* there is a pulley, *d*, which rotates with the shaft, and around this pulley *d* and another similar pulley, *e*, arranged in another stud or upright, E, at the outside rear corner of the platform, passes an endless belt or chain, *f*, said belt or chain being worked by the devices just above described.

F F are two supports, one on the main frame and the other at the outer side of the platform. These supports are set a little in advance (toward the cutters) of the endless belt or chain, and have slots *i* cut in them vertically, so that the guide-rod *g*, which is supported in them, may be adjusted therein at such height or position as may be found desirable. Upon this guide-rod *g* is placed a carriage, *h*, which, to avoid friction and cause it to traverse with as little resistance as possible, is furnished with friction-rollers 1 2 3 4 grooved out to fit the rod, which is round, and as this carriage rocks or rolls slightly on said guide-rod to allow the rake connected with it its proper motions it will be seen that from the shape of the space between the opposite friction-rolls, each having a semicircular groove, the said carriage might turn around freely on said guide-rod and still have its friction-rolls bearing on the rod. This arrangement I believe to be much the best; but guide-rods having any other cross-section than a circular one may be substituted for the round one, and the rod may be rocked or rolled instead of the carriage, or both together, without affecting the principle involved.

To a socket, *k*, on the front side of the carriage, or its equivalent, is fastened the rake-handle *l*, furnished with teeth *m*, that diminish in length from the rear toward the front of the rake, so that all may touch the platform to insure its being uniformly cleared by said rake. To the rear of said carriage is connected a rod, *n*, which projects therefrom and passes into a dead-eye, *o*, on the endless belt or chain *f*, and fitting loosely therein. When this dead-eye *o*, with the rod *n* in it, is on that part of the traveling belt which is in line with the tops of the pulleys *d e* the rake is then down upon the platform and sweeping off the cut grain; but when the dead-eye passes around the pulley *d* and gets upon the line of the lower sides of said pulleys *d e*, then the point of the rake rises up and passes back over the platform in this raised position for the next succeeding operation. The rake thus, by an exceedingly simple combination of parts, which cannot become disarranged, traverses back and forth across the top of the platform, clearing it of the cut grain, and returning at sufficient elevation for the next similar operation without interfering with the grain that is being cut and falling upon the platform.

A raker that rakes and delivers automatically or at stated periods must produce gavels of various sizes, just as the standing grain happens to be thick or thin. For this reason such rakes are not desirable. I therefore do not cause my rake to deliver the gavel on the ground, but so arrange it that it clears the platform and sweeps the cut grain into a receiver, the bottom of which may be of canvas G or other flexible material. This receiver is placed between the end of the platform and the main frame, and the cut grain is raked into it, the butts of the straw being toward the front of the machine. When sufficient has accumulated therein to form a gavel the receiver empties itself automatically, being thrown into gear with the moving parts of the machine by the conductor or driver from his seat, as follows: At the front of the receiver there is a board or piece of metal, H, that projects upward far enough to insure its catching all the straw or grain lying in the receptacle. The front end of the canvas G is connected to this board H, and the rear end of this canvas bottom is firmly connected to a roller or drum, $r$, on a shaft, $s$, at the rear of the machine. On this shaft $s$ there is a loose pulley, $t$, having a stud or pin, $u$, upon it, which, when brought up against a stud or pin, $v$, on the drum $r$, forms a clutch, and the drum is then set in motion by an endless belt passing from a pulley, $w$, on the shaft C to and around the aforesaid pulley $t$, and, winding up the canvas on itself, it draws the board or plate H toward the rear of the machine, and thus "butts off" the gavel onto the ground. The loose pulley $t$ is thrown into gear with the drum $r$ by the conductor in his seat, who with his foot moves the clutch-lever $x$ to the right. When the gavel is butted off the clutch-lever is moved in the opposite direction, which throws out the clutch, and the board H and apron G are instantly returned to their proper positions for receiving the next gavel. The delivery of the gavel is effected when the rake, after it has deposited its rakings in the receptacle, rises to return for its next raking operation, and thus the rake continues to work with a regular uniform motion, while the delivering of the gavel is at the option or will of the conductor. The returning of the "butting-board" H, after it has delivered the gavel on the ground, is as follows: At the front and under side of that part of the frame immediately in advance of said board H there is a shaft, I, upon which is a conical pulley, $y$, that takes up a cord, one end of which is attached to said pulley, and the other end, 5, to said board H. A spiral spring shielded in a case, J, has one of its ends attached to the frame of the machine, and its other end connected to the shaft I in such manner that when the canvas is wound up on the drum $r$ the spiral spring shall also, by the turning of said shaft I, be wound up. When the drum $r$ is released from the clutch-pulley the spiral spring uncoils and turns the shaft I, which winds up the cord 5 and draws the board back to its original position again. The conical pulley $y$ compensates for the varying power of the helical spring.

Having thus fully described the nature and object of my raking and delivering apparatus for harvesting-machines, what I claim therein as new, and desire to secure by Letters Patent, is—

1. Giving the rake its reciprocating and rising-and-falling motions by means of a single traveling belt or chain, without any other appliances, and substantially in the manner described.

2. In combination with a uniformly-moving automatic rake, a delivering apparatus which is set in motion by the conductor, and butts off the gavel and returns for the next succeeding similar operation, substantially as herein described.

W. A. WOOD.

Witnesses:
LEONARD KING,
S. E. BALL.